United States Patent [19]

Sahara

[11] 4,367,933
[45] Jan. 11, 1983

[54] AUDIBLE INDICATION DEVICE FOR CAMERAS

[75] Inventor: Masayoshi Sahara, Sennan, Japan

[73] Assignee: Minolta Camera Kabushiki Kaisha, Osaka, Japan

[21] Appl. No.: 211,906

[22] Filed: Dec. 1, 1980

[30] Foreign Application Priority Data

Dec. 6, 1979 [JP] Japan ............................ 54-169416[U]

[51] Int. Cl.³ ...................... G03B 15/05; G03B 17/18; G08B 23/00
[52] U.S. Cl. ............................... 354/23 D; 354/60 E; 354/127; 354/238; 354/289; 340/522
[58] Field of Search ................... 354/23 D, 60 E, 127, 354/128, 237–240, 289; 352/170, 171; 340/328, 329, 384 E, 521, 522, 635, 636, 692, 500, 517

[56] References Cited

FOREIGN PATENT DOCUMENTS 4734097 10/1972 Japan .
5482631  6/1979 Japan .

*Primary Examiner*—L. T. Hix
*Assistant Examiner*—William B. Perkey

*Attorney, Agent, or Firm*—Watson, Cole, Grindle & Watson

[57] ABSTRACT

An audible indication system indicates, by sound, information relating to camera operation and/or exposure condition such as information that a self-timer is in operation, that the camera is operated by a remote control signal, that the brightness of an object to be photographed is in a blur-occurring range or so high as to require non-available shutter speed, or that an electronic flash is ready for firing. A control means is provided for controlling the volume of the sound in accordance with the information to be indicated such that the information to be recognized remotely from the indicator, such as the information of self-timer operation and remotely controlled camera operation, is indicated with sound of a loud volume, while the information to be recognized in the proximity of the indicator, such as warning of out-of-range object brightness and the ready condition of an electronic flash device, is indicated with sound of relatively low volume. Additionally, the frequency of the sound for the indication may be changed depending on the information to be discriminated.

9 Claims, 4 Drawing Figures

AUDIBLE INDICATION DEVICE FOR CAMERAS

BACKGROUND OF THE INVENTION

1. Field of the Invention

The present invention relates to an audible camera indication device which provides sound indications relating to picture taking or photographing, such as an indication of self-timer operation, remote camera control operation, or ready condition of a flash device, or warning of that the scene brightness is outside of a higher limit or of the value of a blur-occurring shutter speed.

2. Description of the Prior Art

A Japanese Published Utility Model Application No. Jikkosho 47-34097 and a Japanese Laid-Open Utility Model Application No. Jikkaisho 54-82631 disclose respectively an audible indication device which produces sound while a self-timer is in operation for delaying shutter actuation after manual releasing operation. It is expected to be more effective to attract attention of the camera operator if such audible indication is employed not only for the indication of the self-timer operation but also for the warning or alerting of the possibility of a blurred picture, warning of high scene brightness requiring a shutter speed outside of an available range and for other indications, in place of, or in combination with, conventional visual indications.

Of those indications and warning, the ones relating to self-timer operation and remote-controlled camera operation are to be recognized at a place remote from the sound source, while the indication or warning of a blur-occurring shutter speed, information of light measuring such as of higher out-of-range brightness, and information of charge completion of an electronic flash capacitor and the like are to be recognized by the camera operator while holding the camera including the sound sources for such indications. Therefore, if the volume of the sound for such indication or warning is set or determined so large as to be sufficiently recognized even in the case of a remotely recognized indication, it will sound too loud in the case of an indication to be recognized proximate to the camera. However, if the volume of the audible indication is adjusted to a level suitable for the proximity indication, it will be difficult for the remote indication to be recognized.

SUMMARY OF THE INVENTION

The object of the present invention is to provide an audible indication device wherein a sound generator is operated to generate sound having a level varying in accordance with the nature of the indication or warning to be made by the sound.

In accordance with the present invention, the sound level for the indication to be recognized by the camera operator proximate to the sound source is not so high as to offend to the photographer, while the level of the sound to be recognized at a distance from the source is large enough to reach the receiver.

According to an embodiment of the present invention, an identification or discrimination circuit is provided to control the amplitude and/or frequency of the audible indicator such as a sound generator in accordance with the information to be indicated. The identification circuit may include logical circuit elements such as AND and OR gates and inverter or NOT gates. The logical circuit may select the amplitute of the sound to be generated and also may select the frequency to be applied to a sound generator in accordance with the kind of information being identified. In the most simple case, there may be only two kinds of information to be indicated, one relating to operation of a self-timer, the other to light measurement. Although this simplest case is within the concept of the present invention, the present invention is more effective for the case where the number or kind of the indications to be made by sound is more than two.

Other and further objects and features of the present invention will become obvious upon an understanding of the illustrative preferred embodiments about to be described of the best mode of carrying out the invention with reference to the accompanying drawings in which:

DETAILED DESCRIPTION OF PREFERRED EMBODIMENTS

Figure 1:
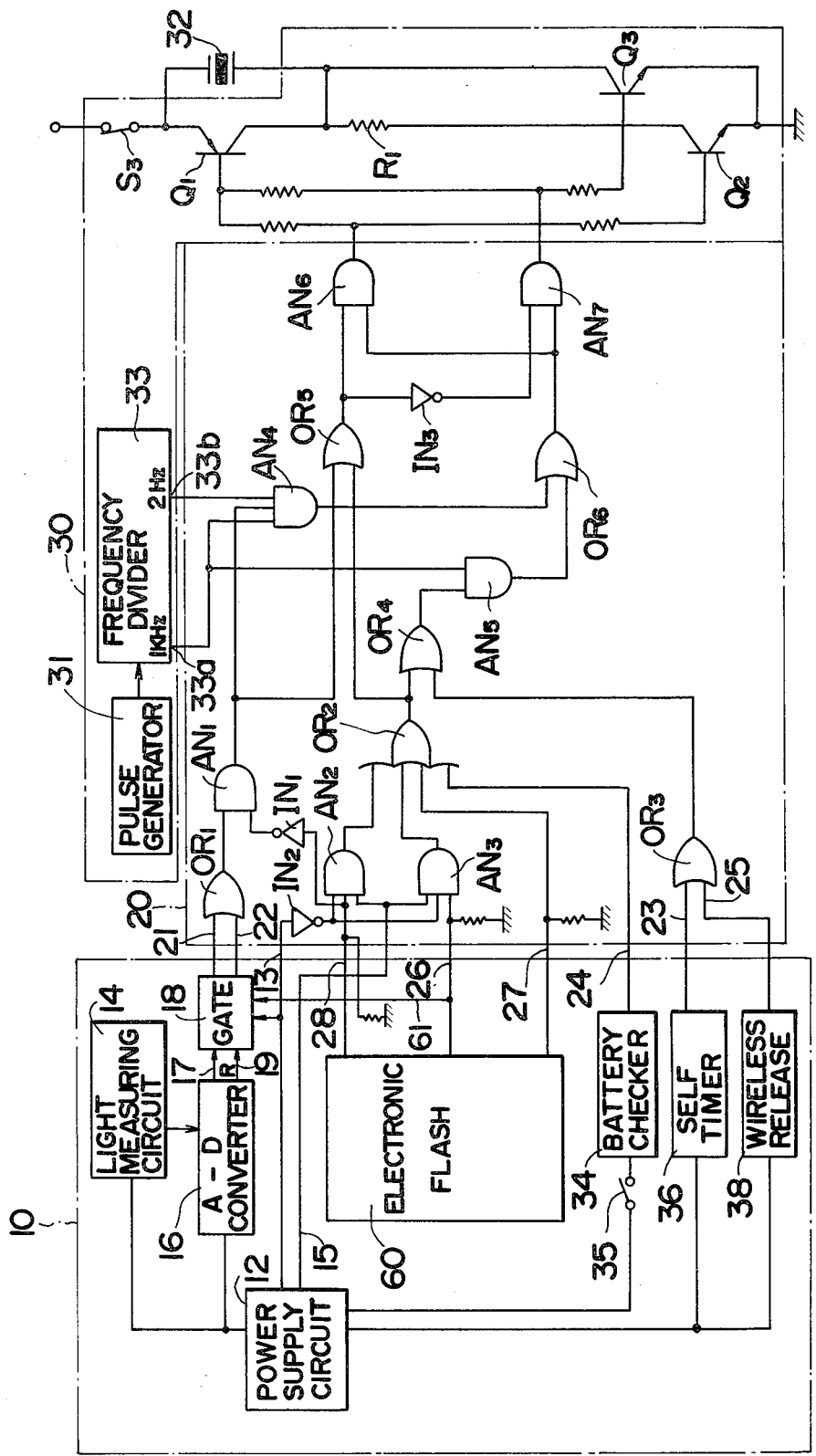
FIG. 1 is a schematic circuit diagram of an embodiment of the present invention.

With reference to FIG. 1, indication signal generating section 10 is included partially in a camera and partially in an electronic flash device and generates a variety of indication signals to be transmitted through input terminals 21 to 28 to sound control section 20 which in turn serves to control sound generator driving circuit 30. Sound control section 20 identifies the signals applied thereto, and controls sound generator driving circuit 30 such that sound generator 32 generates sound large enough in volume to be recognized at a remote distance, for remote signal indication, and that sound generator 32 generates sound volume recognizable without being offensive to the camera operator's ear, for a signal of proximity indication. In addition, the control section 20 controls sound generator 32 to be actuated continuously or intermittently depending on the input signals i.e. the nature of the condition to be indicated.

In further detail, indication signal generating section 10 includes camera power supply circuit 12, which circuit supplies power at given times to light measuring circuit 14, A-D converter 16 for the AC-DC conversion of the output of the light measuring circuit, battery checker 34, self-timer circuit 36 and camera side circuit wireless release means 38. Power supply circuit 12 provides signals through lines 13 and 15 in response to the operation of the camera. Line 13 becomes logic "High" when shutter release operation is made to provide power supply to an electromagnetic release circuit for actuating the camera mechanism, a timing circuit for controlling the timing for actuating the electromagnetic release circuit, and a self-timer circuit, with the power supply circuit being rendered self-maintained. Line 15 remains at a "High" level from shutter charge or cocking completion to shutter closure completion, i.e. exposure termination. A-D converter 16 includes a number of output terminals (not shown), to which light emitting diodes are respectively connected. In accordance with a measured light value, the output at one of the terminals varies, thereby energizing the light emitting diode connected thereto. Line 17 is "High" when a measured light value is outside the high-speed limit corresponding to the fastest shutter speed available with the camera. Line 19 is "High" when a measured light value is within a blur-occurring range that requires a shutter speed slower than a critical value e.g. 1/30 second at which a blurred picture will not occur. When gate 18 for an output generated by A-D converter 16 and transmitted through line 17 or 19 is open, a signal representing a higher out-of-range light value, from line 17 and a signal representing a blur-occurring light value, from line 19 are transmitted through lines 21 and 22 as inputs to OR circuit OR1 of sound control section 20, respectively. Gate 18 is closed when line 13 is at a "High" level and also when line 26 becomes "High" with the main capacitor of electronic flash circuit 60 having been charged as described later.

When battery checker switch 35 is closed, battery checker circuit 34 is connected directly to the battery of power supply circuit 12 to make line 24 "High" when the battery voltage exceeds a predetermined level. When a self-timer setting or selection switch (not shown) is set to the self-timer photography position and camera release operation is made, self-timer circuit 36 makes line 23 "High" and "Low" alternately with a specific cycle during the period from the shutter release operation to the actuation of the camera mechanism. Wireless release device 38 comprises a transmitter section which emits a radiowave, supersonic wave or light release signal at a remote distance from the camera, and a receiver section of a camera for receiving the shutter release signal. Upon receipt of a shutter release signal, the receiver section generates "High" signals for a short period of time for actuating power supply circuit 12, which is in turn self-maintained. At the same time, line 25 remains at a "High" level during the output of the "High" signal.

Electronic flash circuit 60 is designed as an automatic control type flash device wherein a flash tube is triggered to emit flash light in response to camera shutter operation. Light reflected from an object illuminated by the flash light is converted into photoelectric current which, in turn, is integrated, and the flash light is stopped when the integrated photoelectric current reaches a predetermined level. When the power switch of electronic flash circuit 60 is closed and the main capacitor which stores electric energy for flash tube energization is being charged, line 28 is at a "High" level, and when the main capacitor has been charged beyond a predetermined level, line 26 is alternately made "High" and "Low" in a specific cycle, with gate 18 being closed. Line 27 repeatedly changes between "High" and "Low" with a specific cycle for a short period of time immediately after a flash light stop signal is generated.

Pulse generator 31 generates clock pulses with a specific frequency, and frequency divider 33 divides the clock pulses, a clock pulse of 1 KHz being generated from terminal 33a and a clock pulse of 2 Hz from terminal 33b. Sound generator 32 audibly indicates a variety of information, and audible indicating body actuating transistors are labeled Q1, Q2 and Q3, respectively. When transistors Q1 and Q2 are turned on alternately, the capacity component of sound generator 32 is charged through resistor R1, whereby sound generator 32 emits a relatively low sound which is not offensive to the ear near the camera. When transistors Q1 and Q3 are turned on alternately, the capacity component of sound generator 32 is rapidly charged and discharged, whereby sound generator 32 emits a sufficiently large in volume to be recognizable at a remote distance from the generator.

The operation of FIG. 1 will now be described along with the construction of sound control section 20. When a warning signal representing a light value corresponding to a shutter speed outside the high-speed limit or a blur-occurring light level is received from terminal 21 or 22, the output of OR circuit OR1 becomes "High". It should be understood that when the main capacitor charge completion signal is generated from electronic flash circuit 60 through line 61, gate 18 is closed, whereby no warning signal is generated. Additionally, while the main capacitor of the electronic flash device 60 is being charged with the power switch being closed, i.e., while a voltage booster of the electronic flash circuit is in operation, line 28 is at a "High" level, causing the output of inverter IN1 to become "Low", thereby closing AND circuit AN1, from which no warning signal is generated. In short, the output of AND circuit AN1 becomes "High" when the output of light measuring circuit 14 represents an out-of-range high-speed shutter or a blur-occurring shutter speed with no main capacitor charge completion signal from the strobo means or no signal that the main capacitor is charged. When the output of AND circuit AN1 becomes "High" AND circuit AN4 is opened, thereby generating an AND clock pulse as a logical output of a 1 KHz clock pulse from terminal 33a of frequency divider 33 and a 2 Hz clock pulse from terminal 33b. Namely, when the 2 Hz clock pulse is at a "High" level, the 1 KHz clock pulse is generated. The output of AND circuit AN1 is also transmitted to OR circuit OR5 whose output becomes "HIGH". As a result, while the outputs of the two OR circuits OR5 and OR6 are at a "High" level, the output of AND circuit AN6 becomes "High", whereby transistor Q2 is conductive. With OR circuit OR6 at a "Low" level, transistor Q1 is conductive. In response to a clock pulse output of frequency divider 33, transistors Q1 and Q2 are conductive alternately, whereby sound generator 32 gives a warning 2 Hz signal, signaling an out-of-range high shutter speed or blur-occurring low shutter speed with a volume unoffensive to the ear of the camera operator near the camera including the sound generator. Whether the warning represents a high out-of-range shutter speed or a blur-occurring low speed, may be checked by the energization of either one of the light emitting diodes connected to the opposite ends of the outputs of the A-D converter. At this time, as the output of OR circuit OR5 AND circuit AN7 is closed with a "Low" level signal sent through inverter IN3, transistor Q3 remains nonconductive.

When the camera shutter is charged, causing line 15 to become "High" and line 13 to be at a "Low" level due to the unreleased condition of the shutter, and accordingly the output of inverter IN2 to be at a "High" level, with an input signal representing that the voltage booster of the electronic flash is in operation, is applied via terminal 28, the output of AND circuit AN2 becomes "High", which signal in turn is transmitted through OR circuits OR2 and OR4 to the input terminal of AND circuit AN5 to open the gate thereof. As a result, clock pulses of 1 KHz are generated from AND circuit AN5. Also, as the output of OR circuit OR2 is at a "High" level, the output of OR circuit OR5 is also "High", making the outputs of AND circuits AN6 and AN7 "High" and "Low" respectively, whereby transistors Q1 and Q2 are turned on alternately, while transistor Q3 remains nonconductive. Thus, a continuous sound is generated by sound generator 32 with a volume large enough to be recognized by a photographer near the camera including the sound generator.

When an alternative "High" and "Low" signal representing charge completion of the main flash capacitor is applied through terminal 26, with line being 15 "High" in response to shutter charge operation for the camera and line 13 remaining at a "Low" level before shutter release causing the output of inverter IN2 to be "High", a "High" and "Low" alternate signal in a specific cycle in synchronization with the signal from electronic flash circuit 60 is generated from AND circuit AN3, and sound generator 32 generates an intermittent sound recognizable by a photographer near the camera in like manner as in the above case when line 28 is at a "High" level.

Furthermore, when a flash light terminating signal is applied through line 27, transistors Q1 and Q2 are turned ON alternately, while transistor Q3 remains turned OFF as in the case with signal application from other lines of electronic flash circuit 60, whereby sound generator 32 generates, in synchronization with the signal through line 27, an intermittent sound recognizable by a photographer near the camera for a specific period of time.

When a "High" level signal, representing that the output voltage of the camera power battery exceeds a predetermined value, is applied through terminal 24, the output of OR circuit OR2 becomes "High" to open AND circuit AN5, whereby the outputs of both OR circuits OR6 and OR5 become "High", thereby causing sound generator 32 to generate an intermittent sound recognizable by a photographer near the camera.

When a signal is applied to OR circuit OR3 from self-timer circuit 36 or wireless release means 38 through lines 23 or 25, the outputs of OR circuits OR3 and OR4 become "High", opening AND circuit AN5, through which a clock pulse of 1 KHz is input to OR circuit OR6. At this time, as the shutter has already been released, line 13 become "High" and the output of inverter IN2 become "Low". Both outputs of AND circuits AN2 and AN3 are also at a "Low" level and since the battery checker switch is not closed after the shutter release, line 24 is at a "Low" level and since the flash light remains unlit, line 27 is also at a "Low" level. Therefore, the output of OR circuit OR2 is at a "Low" level and furthermore, gate 18 is closed, causing lines 21 and 22 to be "Low", and the output of OR circuit OR1 to be also "Low". As a result, the output of OR circuit OR5 is at a "Low" level, whereby AND circuit AN6 is closed. However, AND circuit AN7 receives a clock pulse from OR circuit OR6, thereby turning on transistors Q1 and Q3 alternately. Consequently, the discharge of sound generator 32 is also made rapidly and the generated sound is large enough in volume to be recognized by a photographer at a distance from the camera sound source. It is to be noted that an intermittent sound is generated in synchronization with an input signal when the self-timer is in operation, while a continuous sound is generated for a specific period of time when the camera shutter is wireless-released.

In the above embodiment, a load connected to the sound generator is changed for changing the volume of the sound to be generated. However, the voltage for driving the generator may be changed for the same purpose. Furthermore, when audible indication is unnecessary for the photographer, switch S3 may be opened manually to make the audible indication device inoperative.

Figure 2:
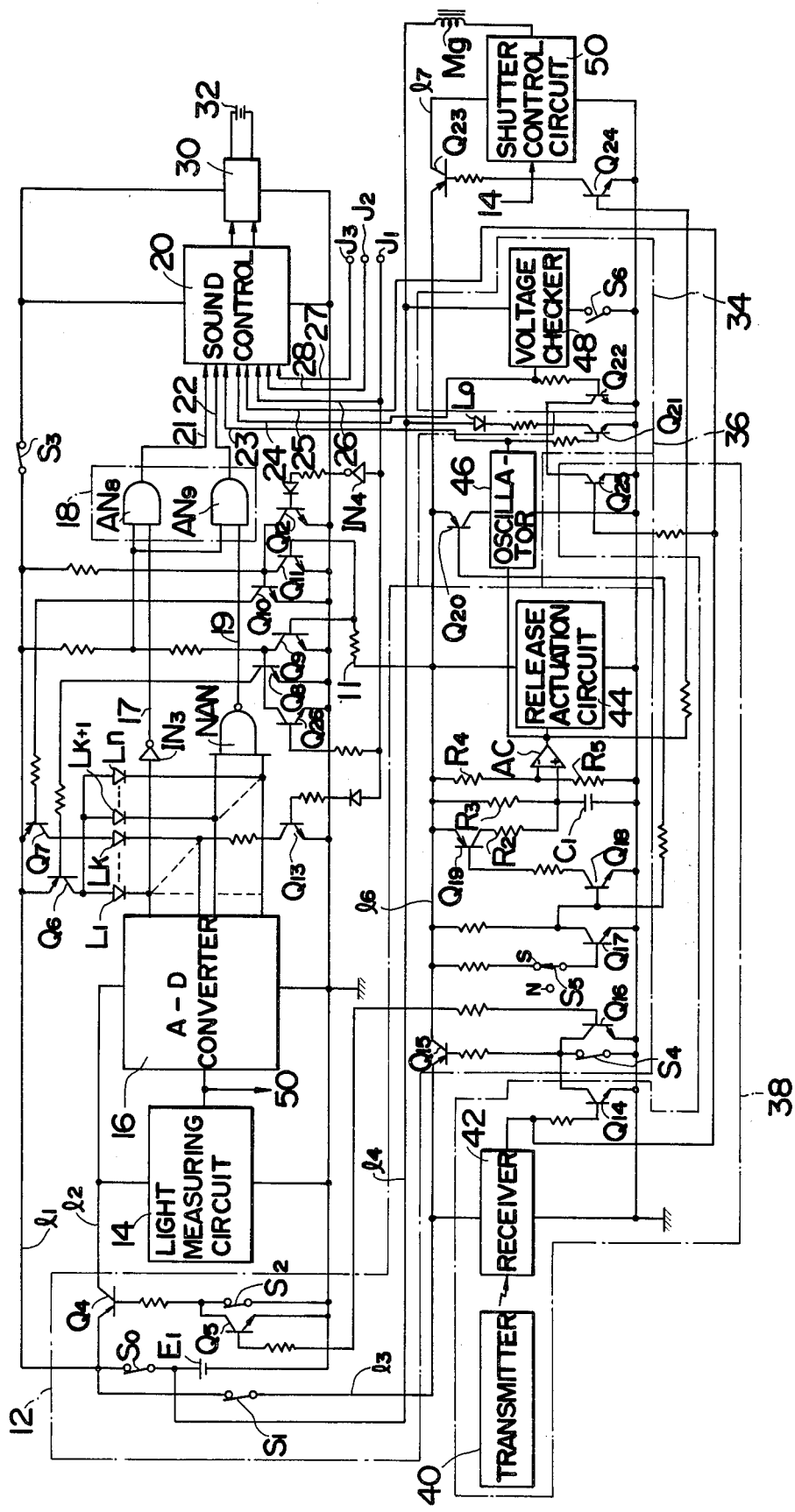
FIG. 2 is a more detailed circuit diagram of a camera circuit for generating various signals to be used in the embodiment of FIG. 1.
Figure 3:
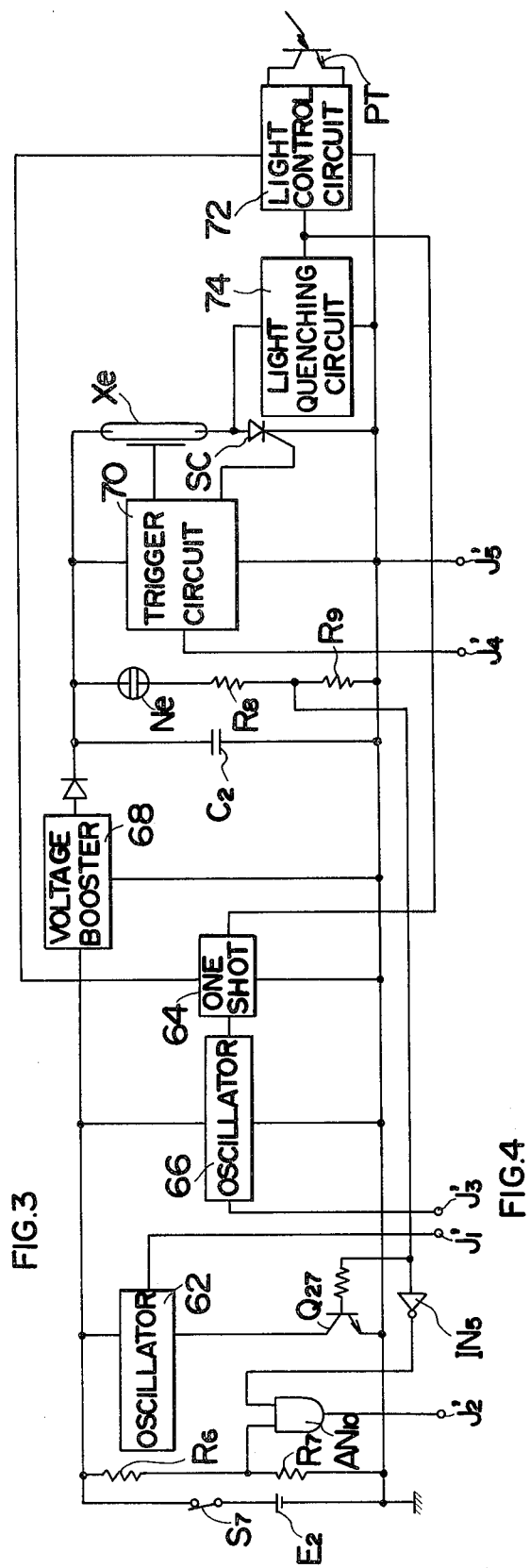
FIG. 3 is a circuit diagram of an electronic flash device to be coupled with the circuitry of FIG. 2.

FIGS. 2 and 3 detail the indication signal generating section 10 of FIG. 1, FIG. 2 showing a circuit diagram of the camera section thereof, and FIG. 3 illustrating a circuit diagram of an electronic flash device, the so-called strobo device circuit 60. With reference to FIG. 2, main switch S0 is manually closed independently of photographic operation. When switch S2 is closed at the first stage of shutter release button depression with main switch S0 having been closed, power supply transistor Q4 is turned ON, supplying power through power supply line 12 to light measuring circuit 14 and visible indicator A-D converter 16, which are energized to be operative. In response to an output signal from light measuring circuit 14 representing a shutter speed value, one of the output terminals of A-D converter 16 becomes "Low", thereby energizing one of indication LEDs L1 through Ln. LED L1 lights up when a signal representing a shutter speed outside the high-speed limit is generated from light measuring circuit 14. LED Lk lights up at the highest shutter speed (e.g. 1/60 second) that can assure synchronization with flash firing. LED Lk 1 is energized at the highest shutter speed (e.g. 1/30 second) within the blur-occurring range, while LED Ln is energized in response to a shutter speed lower than the lowest available value.

When LED L1 is energized, the output of A-D converter 16 connected thereto is at a "Low" level, whereby the output of inverter IN3 becomes "High", and a signal therefrom is transmitted through line 21 as an input to logical sound control circuit 20, thereby actuating sound generator 32 through sound generator driving circuit 30, whereby an audible warning is given of a shutter speed outside the high-speed limit with a volume recognizable by a photographer near the camera.

When one of LEDs Lk+1 through Ln is energized, one of the output terminals of A-D converter 16 connected thereto becomes "Low" and NAND circuit NAN generates a "High" level output, which is transmitted through line 22 as an input to logical sound control circuit 20, whereby sound generator 32 generates sound for warning of a blurred picture as in the case with a shutter speed outside the high-speed limit.

Switch S1 is closed when the shutter is charged, and is opened after exposure termination, e.g. the completion of travel of the second curtain of a two curtain type focal plane shutter. When the shutter release button is depressed further to the second stage with switch S1 closed, then switch S4 is closed, making power supply transistor Q15 conductive. As a result, self-maintaining transistors Q5 and Q16 are turned ON when the base current is supplied thereto, supplying power to a circuit connected to power supply line 16. This power supply continues through lines 12 and 16 until the second curtain terminates its travel to open switch S1, even if switches S2 and S4 are opened. At the same time, transistors Q9 and Q11 are turned ON with the base current supplied thereto through line 11, whereby transistors Q8, Q10, Q6 and Q7 become nonconductive, and LEDs L1 through Ln go off. Additionally, if warning sound is generated to notify a shutter speed outside the high-speed limit or a blur occurring speed in response to a signal from line 17 or 19, a one of the input terminals of AND circuits AN8 and AN9 becomes "Low" by the conduction of transistor Q9, whereby the warning sound stops.

If, at this time, self-timer selector switch S5 is connected to terminal N, transistors Q18 and Q19 become conductive due to non-conduction of transistor Q17, whereby capacitor C1 is rapidly charged through resistors R2 and R3. When the charging voltage exceeds the voltage at the node of voltage dividing resistors R4 and R5, the output of comparator AC is inverted to become "High". This causes release actuation circuit 44 to operate, thereby actuating a camera exposure control mechanism (i.e., mechanical parts of a camera or mirrors, diaphragms and shutter mechanisms for a single-lens reflex camera). Subsequently, transistors Q23 and Q24 are turned ON, supplying power through power supply line 17 to shutter speed control circuit 50 and a shutter speed is controlled by a signal from light measuring circuit 14. When the second curtain completes its travel which was initiated by the activation of electromagnet Mg after a lapse of a given time commensurate with the output of light measuring circuit 14, switch S1 is opened, thereby stopping the power supply through line 13. If, at this time, switch S2 is closed, the power supply through lines 12 and 11 continues, whereby the blocked indication through line 11 is released when switch S1 is opened, causing the indication of a shutter speed and warning of anticipation of a shutter speed outside the high-speed limit or a blur-occurring speed.

Next, when self-timer selector switch S5 is connected to terminal S, transistors Q15 and Q17 are turned ON one after another while transistors Q18 and Q19 become nonconductive. Thus, capacitor C1 is charged by current passing through resistor R3 alone, so that the time from shutter release operation until the output of comparator AC is inverted will be about 10 seconds, for example. At this time, transistor Q20 is turned ON, causing oscillation circuit 46 to be operative. Therefore, when power supply to line 6 begins, an oscillating signal of "High" and "Low" levels is generated as an output signal, in synchronization with which LED L0 goes off, and the signal is transmitted through line 23 as an input to logical sound control circuit 20, whereby sound generator 32 generates intermittent sound in synchronization with the blinking of LED L0 when it goes off, the sound signal being loud enough to be recognizable by a photographer at a distance from the camera. When capacitor C1 is charged to a predetermined value and the output of comparator AC is inverted to a "High" level, oscillation circuit 46 becomes inoperative in response to the signal input thereto, whereby LED L0 goes out and the sound signal is not generated. At the same time, release actuation circuit 44 is actuated to control exposure.

The following description is of wireless release operation. When a photographer sends a shutter release signal from transmitter 40 towards a camera whose shutter is charged to close switch S1 beforehand, receiving circuit 42, in response to the release signal, generates a "High" level signal for a specific period of time. This signal turns transistor Q14 ON, whereby transistors Q15, Q16, Q5 and Q4 are also turned ON for power supply from lines 12 and 6 to be maintained. Thereafter, the shutter is released after a lapse of time determined by delay circuits R2, R3 and C1. This delay time corresponds to the time required for light measuring circuit 14 to become stable. A "High" signal generated by receiving circuit 42 for a specific period of time is input to the base of transistor Q25, causing LED L0 to light up for a specific period of time, whereby it is possible for a photographer to confirm at a distance from the camera that the shutter has been released. Additionally, the "High" signal for a specific period of time is sent through line 25 as an input to logical sound control circuit 20, whereby sound generator 32 generates a sound signal recognizable by a photographer at a distance from the camera indicating that the shutter is released.

The following description is of the battery checks. Battery voltage checker 48 receives power supply from power line 14. With battery checker switch S6 closed, voltage checker 48 becomes operative and a "High" level signal is generated from the output terminal thereof when the output voltage of power cell E1 exceeds a predetermined value, whereby transistor Q22 is turned ON and LED L0 lights up. At the same time, the "High" level signal is sent through line 24 as an input to logical sound control circuit 20, whereby sound generator 32 generates a sound signal recognizable by a photographer near the camera, indicating that the output voltage of power cell E1 is sufficient.

With reference to FIG. 3, when main switch S7 is closed, voltage booster 68 starts operating, and the potential at the node of resistors R6 and R7 becomes "High". This "High" signal is sent through terminal J'2 of AND circuit AN10, camera terminal J2 and line 28 (FIG. 2) as an input to logical sound control circuit 20 (FIG. 2), causing sound generator 32 to generate sound recognizable by a photographer near the camera for the period from the shutter charge completion to its release.

When the charging voltage of capacitor C2 exceeds a predetermined value, neon tube Ne lights up, causing the outputs at the node between resistors R8 and R9 to become "High". The "High" signal thereof makes the output of inverter IN5 "Low", whereby the output of AND circuit AN10 also becomes "Low". Consequently, when the charging voltage of capacitor C2 reaches a predetermined value, the "High" signal at the node of resistors R8 and R9 indicating that voltage booster 68 is in operation is not generated. That "High" signal indicating the operation of neon tube Ne turns transistor Q27 ON, thereby actuating oscillation circuit 62. The oscillation signal is transmitted through terminal J'1, camera terminal J1 and line 26 as an input to logical sound control circuit 20, whereby sound generator 32 generates sound recognizable by a photographer near the camera while the shutter is charged and released. Furthermore, the neon tube on-signal is applied to the base of transistor Q13 through the illustrated diode (FIG. 2), to the base of transistor Q26 through the illustrated resistor and to the base of inverter Q12 through interveter IN4, and the illustrated resistor and diode. When the oscillation signal generated from oscillation circuit 62 in response to turning on of the neon tube, oscillates between high and low levels, the high level being higher than the voltage drop across two series-connected diodes, while the low level being lower than the voltage drop across two series-connected diodes but higher than the voltage drop across a single diode, transistors Q13 and Q12 are repeatedly turned ON and OFF with the former in-phase and the latter in antiphase with the oscillation signal, respectively. Therefore, transistors Q7 and Q10 are repeatedly turned ON and OFF in phase with each other, whereby LED Lk goes off. However, transistor Q26 is turned ON, regardless of the oscillation signal output, and transistor Q6 is turned OFF, whereby the other LEDs do not light up.

With the input of a synchronous switch closure signal, i.e., flash initiating signal from a camera through terminals J'4 and J'5, trigger circuit 70 is actuated, thereby causing the main discharge tube i.e. flash tube Xe to emit light. When photosensitive element PT, such as a phototransistor, receives the flash light reflected from an object illuminated thereby and light control circuit 72 generates a light quenching signal, light quenching circuit 74 is actuated, causing thyristor SC to be turned off, whereby flash light emission is stopped. At the same time, a light quenching signal actuates one-shot circuit 64 for generating a "High" level signal for a specific period of time so that specific period oscillating circuit 66 may be actuated. The signal from oscillating circuit 66 is transmitted through terminal J'3, camera terminal J3 and line 27 to logical sound control circuit 20, causing sound generator 32 to generate intermittent sound recognizable by a photographer near the camera, indicating that flash control operation has been completed.

Figure 4:
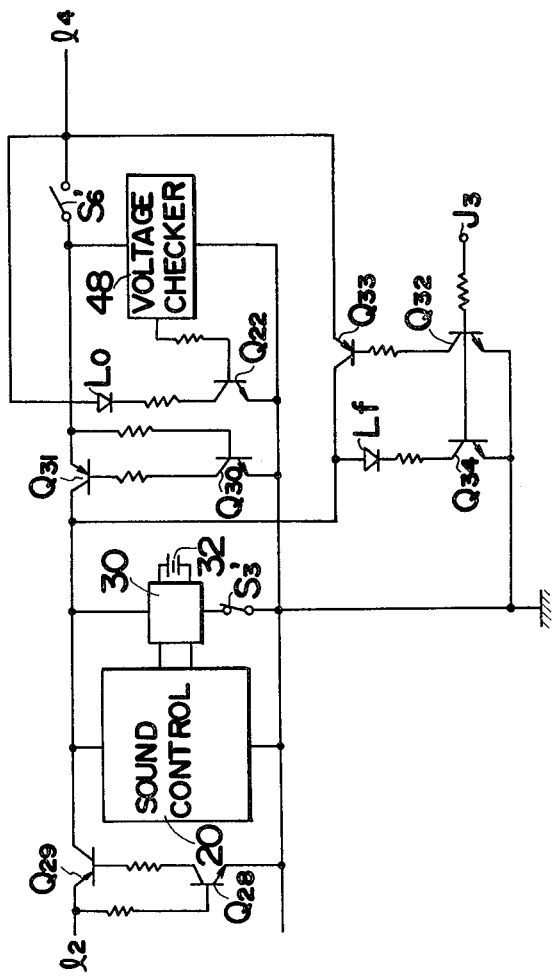
FIG. 4 illustrates a circuit diagram of another embodiment for a power supply of the audible indication device of the invention.

FIG. 4 shows a circuit diagram of another embodiment of a power supply circuit. This circuit is characterized by the construction in which power supply to the sound generator is independent of other systems, particularly when the battery voltage is checked and when flash light is stopped. Switches S0 and S2 (FIG. 2) are closed to turn transistor Q4 ON for power supply from line 12 and power is supplied by transistors Q28 and Q29 to audible indicating device 30, whereby a sound signal is generated in response to the warning signal, electronic flash power switch closure signal, neon tube on-signal, self-timer on-signal and wireless release signal. When voltage checker switch S6' is closed, power is supplied by transistors Q30 and Q31, whereby a sound signal is generated in response to a signal from voltage checker 48. When a flashlight control signal is sent through terminal J3 as an input, power is supplied by transistors Q32 and Q33, whereby a sound signal in response to the flashlight control signal is generated. It should be noted that LED Lf goes off in response to the flashlight control signal.

The present invention is not limited to the above-described embodiments, and is applicable, for example, to a case where the information to be indicated includes one for remote indication respectively and proximity indication. The identification of the kind of indications and control of the sound generator may be made according to the number of indications. Also, to change the volume of the sound of the sound generator, the capacity component of the sound generator may not be charged and discharged slowly and rapidly, but the voltage for driving the sound generator may be changed. For such control, two actuating circuits may be provided (part of the circuitry may be used in combination, in this case, too) to be selectively operated by a proper switching circuit or a switching device, in place of selecting a circuit element like the resistor in the sound generator driving circuit by its insertion and removal, selective connection or partial short-circuiting. Those skilled in the art will also recognize that the audible indication device for cameras of the present invention as described herein is capable of being modified in accordance with known principles and techniques applicable to the art of photography, and therefore the present invention is not intended to be limited by the specific embodiment herein described, but the scope of the invention is to be determined by the following claims with consideration being given to the equivalence of the claimed components, individually and collectively in combination.

I claim:

1. An audible indication device for a camera comprising:
   a sound generator for generating sound;
   means for driving said sound generator;
   a first signal generator for generating a first indication signal representative of information to be recognized in the proximity of the indication device;
   a second signal generator for generating a second indication signal representative of information to be recognized remotely from the indication device; and
   sound control means connected to said first and second signal generator for determining which signal generator generates a signal and said driving means including means to change the volume of the sound to be generated by said sound generator in accordance with the output of said sound control means such that the sound generated by said sound generator differs depending on which indication signal is generated.

2. The audible indication device as in claim 1 wherein said control means further controls said driving means to change, in addition to the volume, the frequency of the sound generated by said sound generator, in accordance with the determined indication signal.

3. The audible indication device as claimed in claim 1 further comprising a fourth signal generator for generating a fourth indication signal representative of the condition of a power source battery with the sound generator generating a sound audible in the proximity of the device.

4. The audible indication device as in claim 1 wherein said driving means includes a first drive means for driving said sound generator to generate sound of a first level recognizable in the proximity of the sound generator, and a second means for driving said sound generator to generate sound of a second level recognizable remotely, and said control means includes selection means for selecting the first and second means.

5. The audible indication device as in claim 4 wherein said first signal generator generates, as said first indication signal, a signal representing that a brightness of an object to be photographed is outside of a predetermined range, and said second signal generator generates, as said second indication signal, that a self-timer is in operation.

6. The audible indication device as in claim 4 further comprising a third signal generator for generating a third indication signal, said third signal generator being also connected with said sound control means such that said third signal is also determined.

7. The audible indication device as in claim 6 wherein said third signal generator generates, as said third signal, a signal relating to operation of an electronic flash device coupled with said camera.

8. The audible indication device as in claim 6 wherein said sound control means includes a logic circuit.

9. An audible indication device as claimed in claim 6 wherein said sound generator generates a second signal audible in the proximity of the device in response to said third signal.

* * * * *